United States Patent
Gangireddy (10) Patent No.: US 12,210,862 B2
(45) Date of Patent: Jan. 28, 2025

(54) PERIODIC REFRESH OF CHATBOT FROM VIRTUAL ASSISTANT TIMELINE ANALYTICS OF USER CONVERSATIONS

(71) Applicant: ADP, Inc., Roseland, NJ (US)

(72) Inventor: Uday Kumar Reddy Gangireddy, Cumming, GA (US)

(73) Assignee: ADP, Inc., Roseland, NJ (US)

( * ) Notice: Subject to any disclaimer, the term of this patent is extended or adjusted under 35 U.S.C. 154(b) by 211 days.

(21) Appl. No.: 17/690,086

(22) Filed: Mar. 9, 2022

(65) Prior Publication Data

US 2023/0289167 A1  Sep. 14, 2023

(51) Int. Cl.
| | |
|---|---|
| *G06F 8/65* | (2018.01) |
| *G06N 5/022* | (2023.01) |
| *G10L 15/18* | (2013.01) |
| *G10L 15/26* | (2006.01) |
| *H04L 51/02* | (2022.01) |

(52) U.S. Cl.
CPC .............. *G06F 8/65* (2013.01); *G06N 5/022* (2013.01); *G10L 15/1822* (2013.01); *G10L 15/26* (2013.01); *H04L 51/02* (2013.01)

(58) Field of Classification Search
CPC ....................................................... G06F 8/65
See application file for complete search history.

(56) References Cited

U.S. PATENT DOCUMENTS

| | | | |
|---|---|---|---|
| 11,811,718 B2* | 11/2023 | Prasad | H04L 51/42 |
| 2018/0062941 A1* | 3/2018 | Brown | H04L 41/5032 |
| 2022/0232126 A1* | 7/2022 | Naidu | H04M 3/5166 |
| 2022/0365775 A1* | 11/2022 | Wei | G06F 11/3604 |
| 2023/0037894 A1* | 2/2023 | Arya | G06F 40/40 |

OTHER PUBLICATIONS

Avi Yaeli et al., "Dialog Flow Analysis for Watson Assistant", IBM Cloud Pak for Data, MIT License, https://dataplatform.cloud.ibm.com/exchange/public/entry/view/013c690997e27f3a8d9133265327a9e5, Modified Jun. 25, 2020, downloaded Dec. 15, 2021, 1 page.

\* cited by examiner

*Primary Examiner* — Jae U Jeon
(74) *Attorney, Agent, or Firm* — Foley & Lardner LLP (57) ABSTRACT

Aspects of the present disclosure relate generally to chatbot performance and, more particularly, to periodically refreshing chatbots from timeline analytics of user online conversations to improve performance. In embodiments, a method includes: receiving, by a computing device, a plurality of conversation transcripts generated from a plurality of versions of a chatbot; determining, by the computing device, a plurality of changes of a plurality of attributes of intents between the plurality of the versions of the chatbot; identifying, by the computing device, at least one intent to update from the plurality of changes of the plurality of attributes of the intents to improve performance of the chatbot; and generating, by the computing device, another version of the chatbot that includes the at least one intent updated from the plurality of changes of the plurality of attributes of the intents to improve the performance of the chatbot.

19 Claims, 7 Drawing Sheets

Metric Movers
Prominent Intents

Containment(%) — 502

UC-Redirect-IT-Questions: 9.61 (▲1.8%)
UC019-Get-Access: 4.97 (▲8.04%)
UC-Change-Tax-Withholding: 3.58 (▲3.47%)
UC-Explain-LOA: 3.18 (▲47.91%)
BASE_hello: 3.01 (▲85.8%)
UC-Salary-structure: 0.0 (▼100.0%)
UC-Car-Allowance: 0.0 (▼100.0%)
UC-Standout-training: 0.0 (▼100.0%)
UC-RTO-accommodations: 0.0 (▼100.0%)
UC-Make-Pay-Change: 0.0 (▼100.0%)

Volume — 504

UC-Redirect-IT-Questions: 9.77 (▼2.69%)
UC019-Get-Access: 6.68 (▼2.48%)
UC-HRPRC-Contact-Info: 5.62 (▲8.08%)
UC-Change-Tax-Withholding: 4.07 (▲0.25%)
BASE_hello: 3.75 (▲65.2%)
UC-Make-Pay-Change: 0.08 (▼33.33%)
UC-LeadingHeart-LossOfFamily: 0.08 (▲14.29%)
UC-Standout-training: 0.08 (▼46.67%)
UC-Open-Enrollment-Roll-Over: 0.08 (▲300.0%)
UC-Travel-and-entertainment-policy: 0.08 (▼57.89%)

Confidence — 506

BASE_No: 1.0 (▲132.56%)
UC-Pension-plans: 1.0 (▲42.86%)
BASE_goodbye: 1.0 (▲127.27%)
UC-Salary-structure: 1.0 (▲78.57%)
UC-Get-volunteer-policy: 0.98 (▲36.11%)
UC-RTO-accommodations: 0.31 (▲0.0%)
UC-Get-approved-dental-providers: 0.31 (▼55.71%)
UC-Abridgement-eligibility: 0.29 (▼43.14%)
UC-FPR-Merits: 0.27 (▼57.81%)
UC-Explain-Garnishment: 0.27 (▼55.74%)

EscalatedReason-Negativefeedback — 508

UC_get_card: 0.08 (▲8.0%)
UC-eTime-Reports: 0.08 (▲8.0%)
UC-Open-Enrollment-New-Hire-Enroll-Again: 0.0 (▲0.0%)
UC-Open-Enrollment-Opt-Out: 0.0 (▲0.0%)
UC-Open-Enrollment-Prescription-Plan: 0.0 (▲0.0%)
UC-Get-GJA-info: 0.0 (▲0.0%)
UC-Get-First-Pay: 0.0 (▲0.0%)
UC-Get-Dental-plans: 0.0 (▲0.0%)
UC-Get-Bereavment-policy: 0.0 (▲0.0%)
UC-LOA-Application: 0.0 (▲0.0%)

EscalatedReason-Dontunderstand — 510

UC019-Get-Access: 1.47 (▼20.11%)
UC-401K-Program: 0.81 (▼18.18%)
UC-Update-Personal-Information: 0.65 (▲140.74%)
UC-Open-Enrollment-Dependents: 0.65 (▲441.67%)
UC-Explain-LOA: 0.41 (▲51.85%)
UC-Get-salary-range: 0.0 (▲0.0%)
UC-Get-national-holiday-policy: 0.0 (▼100.0%)
UC-Get-jury-duty: 0.0 (▲0.0%)
UC-Get-job-title: 0.0 (▲0.0%)
BASE_No: 0.0 (▲0.0%)

EscalatedReason-Requestedagent — 512

BASE_representative: 1.71 (▼29.92%)
UC_HR_Business_Partner: 0.41 (▲485.71%)
UC-Change-HSA-Contributions: 0.33 (▲175.0%)
BASE_hello: 0.24 (▲140.0%)
UC-401K-Program: 0.24 (▲26.32%)
UC-Get-Vendor-ID: 0.0 (▲0.0%)
UC-Get-Pay-Date: 0.0 (▼100.0%)
UC-Get-Insurance-group-plan: 0.0 (▼100.0%)
UC-Get-GJA-info: 0.0 (▼100.0%)
UC-LOA-Application: 0.0 (▼100.0%)

EscalatedReason-Needrep — 514

UC-HRPRC-Contact-Info: 3.18 (▲40.09%)
UC-Missing-Pay: 0.81 (▲3950.0%)
UC-Incorrect-Pay: 0.81 (▲3950.0%)
UC019-Get-Access: 0.16 (▲16.0%)
UC-Get-case-update: 0.16 (▲128.57%)
UC-Get-Pay-Date: 0.0 (▲0.0%)
UC-Get-Overtime-policy: 0.0 (▲0.0%)
UC-Get-Insurance-group-plan: 0.0 (▲0.0%)
UC-Get-GJA-info: 0.0 (▲0.0%)
UC_get_card: 0.0 (▲0.0%)

EscalatedReason-Angryuser — 516

BASE_No: 0.0 (▲0.0%)
UC-Return-from-LOA: 0.0 (▲0.0%)
UC-Report-Issue-AR: 0.0 (▲0.0%)
UC-Redirect-IT-Questions: 0.0 (▲0.0%)
UC-RTO-schedule: 0.0 (▲0.0%)
UC-Get-GJA-info: 0.0 (▲0.0%)
UC-Get-First-Pay: 0.0 (▲0.0%)
UC-Get-Dental-plans: 0.0 (▲0.0%)
UC-Get-Bereavment-policy: 0.0 (▲0.0%)
UC_get_card: 0.0 (▲0.0%)

EscalatedReason-Characterlimit — 518

UC-Make-Life-Event-Change: 0.16 (▲700.0%)
UC-Report-Issue-AR: 0.08 (▲8.0%)
UC-Issue-clocking-in-out: 0.08 (▲8.0%)
UC-Open-Enrollment-New-Hire-Enroll-Again: 0.08 (▲8.0%)
UC-RTO-accommodations: 0.08 (▲8.0%)
UC-Get-GJA-info: 0.0 (▲0.0%)
UC-Get-First-Pay: 0.0 (▲0.0%)
UC-Get-Dental-plans: 0.0 (▲0.0%)
UC-Get-Bereavment-policy: 0.0 (▲0.0%)
UC_get_card: 0.0 (▼100.0%)

EscalatedReason-Unknown — 520

BASE_hello: 0.08 (▲300.0%)
UC-Get-GJA-info: 0.08 (▲8.0%)
UC-Employee-Assistance-Program: 0.08 (▲8.0%)
UC-Change-Tax-Withholding: 0.08 (▲60.0%)
BASE_No: 0.0 (▲0.0%)
UC-Get-Pay-Date: 0.0 (▲0.0%)
UC-Get-Overtime-policy: 0.0 (▲0.0%)
UC-Get-Insurance-group-plan: 0.0 (▲0.0%)
UC-Get-First-Pay: 0.0 (▼100.0%)
UC_get_card: 0.0 (▼100.0%)

Top Gainers/Losers

Containment(%) — 602

UC-Get-jury-duty: 0.33 (▲1550.0%)
UC-Explain-tuition-reimbursement-program: 0.65 (▲828.57%)
UC-Denied-Leave: 0.16 (▲700.0%)
UC-Get-Overtime-policy: 0.33 (▲371.43%)
UC-Explain-student-repayment-loan-program: 0.33 (▲371.43%)
UC-Make-Pay-Change: 0.0 (▼100.0%)
UC-Car-Allowance: 0.0 (▼100.0%)
UC-Standout-training: 0.0 (▼100.0%)
UC-See-Historical-Corrections: 0.0 (▼100.0%)
UC-Salary-structure: 0.0 (▼100.0%)

Volume — 604

UC-Get-jury-duty: 0.33 (▲1550.0%)
UC-See-associates-standout: 0.24 (▲1100.0%)
UC-Open-Enrollment-New-Benefits: 0.24 (▲1100.0%)
UC-Explain-student-repayment-loan-program: 0.49 (▲600.0%)
UC-Explain-tuition-reimbursement-program: 0.65 (▲550.0%)
UC-FPR-Bonus: 0.16 (▼80.0%)
UC-Get-national-holiday-policy: 0.41 (▼77.09%)
UC-Get-Vendor-ID: 0.16 (▼75.38%)
UC-vaccination-surcharge: 0.16 (▼72.41%)
UC-Standout-check-ins: 0.16 (▼69.81%)

Confidence — 606

UC-ADA-Accommodations: 0.98 (▲139.02%)
BASE_No: 1.0 (▲132.56%)
BASE_goodbye: 1.0 (▲127.27%)
UC-Salary-structure: 1.0 (▲78.57%)
UC-Open-Enrollment-Dates: 0.57 (▲50.0%)
UC-FPR-Merits: 0.27 (▼57.81%)
UC-Explain-Garnishment: 0.27 (▼55.74%)
UC-Get-approved-dental-providers: 0.31 (▼55.71%)
UC-Open-Enrollment-Access: 0.33 (▼45.0%)
UC-Abridgement-eligibility: 0.29 (▼43.14%)

EscalatedReason-Negativefeedback — 608

UC-eTime-Reports: 0.08 (▲8.0%)
UC_get_card: 0.08 (▲8.0%)
UC-401K-Program: 0.0 (▼100.0%)
UC-Covid-Testing: 0.0 (▼100.0%)
UC-Daily-health-screening: 0.0 (▼100.0%)
UC-Get-case-update: 0.0 (▼100.0%)
UC-Get-job-title: 0.0 (▼100.0%)

EscalatedReason-Dontunderstand — 610

UC-Open-Enrollment-FSA: 0.33 (▲560.0%)
UC-Open-Enrollment-Dependents: 0.65 (▲441.67%)
UC-WFH-Internet-Reimbursement: 0.24 (▲380.0%)
UC-Return-from-LOA: 0.08 (▲300.0%)
UC-Standout-training: 0.08 (▲300.0%)
BASE_goodbye: 0.0 (▼100.0%)
UC-Incorrect-Pay: 0.0 (▼100.0%)
UC_PTO_balance: 0.0 (▼100.0%)
UC-Make-Historical-Corrections: 0.0 (▼100.0%)
UC-Missing-Pay: 0.0 (▼100.0%)

EscalatedReason-Requestedagent — 612

UC_HR_Business_Partner: 0.41 (▲485.71%)
UC-Get-Overtime-policy: 0.08 (▲300.0%)
UC-See-associates-standout: 0.08 (▲300.0%)
UC-Report-Issue-AR: 0.08 (▲300.0%)
UC-Internal-movement: 0.08 (▲300.0%)
BASE_goodbye: 0.0 (▼100.0%)
UC-Make-Historical-Corrections: 0.0 (▼100.0%)
UC-Missing-Pay: 0.0 (▼100.0%)
UC-Negative-Covid-Test: 0.0 (▼100.0%)
UC-Open-Enrollment-Benefit-Start-Date: 0.0 (▼100.0%)

EscalatedReason-Needrep — 614

UC-Missing-Pay: 0.81 (▲3950.0%)
UC-Incorrect-Pay: 0.81 (▲3950.0%)
BASE_hello: 0.08 (▲300.0%)
UC-Set-Direct-Deposit: 0.08 (▲300.0%)
UC-Get-case-update: 0.16 (▲128.57%)
BASE_what_can_you_do: 0.0 (▼100.0%)
UC-Update-Personal-Information: 0.0 (▼100.0%)
UC-Smart-Dollar-Benefit: 0.0 (▼100.0%)
UC-See-pay-increase: 0.0 (▼100.0%)
UC-Open-Enrollment-Medical-Options: 0.0 (▼100.0%)

EscalatedReason-Angryuser — 616

BASE_representative: 0.0 (▼100.0%)
UC-Get-Pay-Statements: 0.0 (▼100.0%)
UC-Sync-etime-punches: 0.0 (▼100.0%)

EscalatedReason-Characterlimit — 618

UC-Make-Life-Event-Change: 0.16 (▲700.0%)
UC-Issue-clocking-in-out: 0.08 (▲8.0%)
UC-Open-Enrollment-New-Hire-Enroll-Again: 0.08 (▲8.0%)
UC-RTO-accommodations: 0.08 (▲8.0%)
UC-Report-Issue-AR: 0.08 (▲8.0%)
BASE_hello: 0.0 (▼100.0%)
UC-Change-Tax-Withholding: 0.0 (▼100.0%)
UC-Covid-Vaccinations: 0.0 (▼100.0%)
UC-Daily-health-screening: 0.0 (▼100.0%)
UC-Get-Pay-Date: 0.0 (▼100.0%)

EscalatedReason-Unknown — 620

BASE_hello: 0.08 (▲300.0%)
UC-Change-Tax-Withholding: 0.08 (▲60.0%)
UC-Employee-Assistance-Program: 0.08 (▲8.0%)
UC-Get-GJA-info: 0.08 (▲8.0%)
UC-401K-Program: 0.0 (▼100.0%)
UC-Why-LOA-Pay-Wrong: 0.0 (▼100.0%)
UC-W2-forms: 0.0 (▼100.0%)
UC-Update-Personal-Information: 0.0 (▼100.0%)
UC-Standout-check-ins: 0.0 (▼100.0%)

PERIODIC REFRESH OF CHATBOT FROM VIRTUAL ASSISTANT TIMELINE ANALYTICS OF USER CONVERSATIONS

TECHNICAL FIELD

The present disclosure relates generally to chatbot performance and, more particularly, to periodically refreshing chatbots from timeline analytics of user online conversations to improve chatbot performance.

BACKGROUND

Chatbot deployment has rapidly changed the landscape of customer service for many organizations. It has become increasingly critical to achieve satisfactory performance of chatbot interactions with customers. In mapping user's goals from inquiries to specific intents in the construction of a chatbot, it remains a challenge to balance defining intents that are too broad and intents that are too narrow for successfully responding to user inquiries. Such distinctions can be very subtle and often require experimentation cycles to learn the right balance of depth or breadth for intents, especially in domains where there are many related topics.

Chatbot performance can deteriorate as topics evolve in response to current events. There may be new topics introduced in user inquiries. In this case, the chatbot needs to be updated to handle these new topics if an organization desires to provide responses about these topics to user inquiries. And user inquiries about topics currently handled by a chatbot may have nuances introduced in inquiries that may include an unavoidable degree of topic overlap occurring. Such topic overlap will often drive the need for additional training examples of utterances within targeted intents.

SUMMARY

In an aspect of the present disclosure, a method includes: receiving, by a computing device, a plurality of conversation transcripts generated from a plurality of versions of a chatbot; determining, by the computing device, a plurality of changes of a plurality of attributes of intents between the plurality of the versions of the chatbot; identifying, by the computing device, at least one intent to update from the plurality of changes of the plurality of attributes of the intents to improve performance of the chatbot; and generating, by the computing device, another version of the chatbot that includes the at least one intent updated from the plurality of changes of the plurality of attributes of the intents to improve the performance of the chatbot.

In another aspect of the present disclosure, there is a computer program product including one or more computer readable storage media having program instructions collectively stored on the one or more computer readable storage media. The program instructions are executable to: receive, by a computing device, a plurality of conversation transcripts generated from a plurality of different time periods by a chatbot; rank, by the computing device, intents with a greatest increase in change from a plurality of changes of a plurality of attributes of the intents associated with the plurality of the conversation transcripts from the plurality of the different time periods by the chatbot; rank, by the computing device, the intents with a greatest decrease in change from the plurality of changes of the plurality of attributes of the intents associated with the plurality of the conversation transcripts from the plurality of the different time periods by the chatbot; and generate, by the computing device, a version of the chatbot that includes at least one intent updated from the rankings of the intents to improve the performance of the chatbot.

In a further aspect of the present disclosure, there is a computer system including a processor, a computer readable memory, one or more computer readable storage media, and program instructions collectively stored on the one or more computer readable storage media. The program instructions are executable to: receive, by a computing device, a plurality of conversation transcripts generated from a plurality of different versions of a chatbot; analyze, by the computing device, a plurality of changes of a plurality of attributes of intents associated with the plurality of the conversation transcripts from the plurality of the different versions of the chatbot; identify, by the computing device, at least one intent to update from the analysis of the plurality of changes of the plurality of attributes of the intents to improve performance of the chatbot; and output, by the computing device, an identification of the at least one intent to update from the analysis of the plurality of changes of the plurality of attributes of the intents to improve the performance of the chatbot.

BRIEF DESCRIPTION OF THE DRAWINGS

Aspects of the present disclosure are described in the detailed description which follows, in reference to the noted plurality of drawings by way of non-limiting examples of exemplary embodiments of the present disclosure.

FIG. 5 depicts an illustration of exemplary metrics in accordance with aspects of the present disclosure.

FIG. 6 depicts an illustration of exemplary metrics in accordance with aspects of the present disclosure.

DETAILED DESCRIPTION OF ASPECTS OF THE INVENTION

The present disclosure relates generally to chatbot performance and, more particularly, to periodically refreshing chatbots from timeline analytics of user online conversations to improve chatbot performance. In more specific embodiments, the systems and methods provides analysis of events, metrics, conversation transcripts and other information generated during the operation of a chatbot interacting in conversations over time and identifies topics handled by the chatbot most in need of updating to improve chatbot performance. For example, performance improvements may be needed for topics not recognized by the chatbot, the chatbot provides responses not specifically addressing the user's inquiry, and/or users requested escalation to a live agent for unsatisfactory responses to their inquiries. In these noted examples, by implementing the systems and methods of the present disclosure, a chatbot can now be refreshed periodically with improvements to recognize topics previously unrecognized by the chatbot, provide responses that specifically address the user's inquiry, and respond more satisfactorily to user inquiries in conversations with users. Advantageously, aspects of the present disclosure automate the analysis of chatbot performance over time, provide insights to key performance changes for robust responses to inquiries, and update the chatbot with the key performance changes. For example, aspects of the present disclosure automatically support iterative chatbot improvements responsive to user inquiries over time, identify key performance changes most in need of updating to improve performance, and reduce experimental cycles of implementing otherwise undirected changes in efforts to improve the chatbot to be more responsive to users.

In more specific embodiments, a chatbot may be instrumented to generate various events and metrics associated with chat conversations in addition to an intent identified by natural language classifiers, such as the satisfaction of a user with the responses provided to the user in a chat conversation, the escalation of a chat conversation from the chatbot to a live agent, the containment of a chat conversation by the chatbot without escalation to a live agent, a confidence probability that the natural language classifiers accurately identified the intent, and so forth. These events and metrics may be associated as attributes of utterances from a chat conversation and stored along with the chat conversation transcript in a conversation file. Natural language classifiers, in embodiments, may be instrumented to generate various events, information and metrics associated as attributes of utterances from natural language text of a chat conversation, including utterance n-grams, a confidence probability of accurately identifying an intent, utterances not recognized, and so forth.

In embodiments, a virtual assistant analytic module analyzes for timeline periods, such as the time periods during which different releases of the chatbot were active, the attributes of utterances including the events, metrics, and other information generated during chat conversations that are stored with the conversation transcripts. The virtual assistant analytic module generates and stores analytic metrics, in embodiments, that identify model improvements for intents, ranks and outputs the intents to update for model improvements for a time period in a timeline and/or between two time periods of a timeline during which different releases of the chatbot were active. The virtual assistant analytic module may also identify changes in metrics between two time periods as well as changes that occurred in the classification model between two time periods in embodiments. For example, among the intents identified to update in order to improve the classification model, there may be an unrecognized intent to add as a new class to the classification model in embodiments. Or there may be utterances occurring in chat conversations that provide improved training data for an existing intent that can be added to the training data to improve the accuracy of the classification model in embodiments. Accordingly, the systems and methods enable a chatbot to be periodically refreshed from timeline analytics of chat conversations to improve performance.

The systems and methods to enable a chatbot to be periodically refreshed from timeline analytics of chat conversations to improve performance provide a technical solution to a problem of determining underperforming chatbot responses to users' inquiries over thousands of conversations daily, understanding what is affecting performance in these chatbot responses to users' inquiries over thousands of conversations daily, and understanding and identifying where improvements need to be made to improve the performance of these chatbot responses to users' inquiries. By analyzing for timeline periods attributes of utterances including the events, metrics, and other information generated during chat conversations that are stored with the conversation transcripts, the systems and methods generate and store analytic metrics that can identify model improvements for intents, rank and output the intents to update for model improvements for a time period in a timeline and/or between two time periods of a timeline during which different releases of the chatbot were active. Furthermore, changes in metrics between two time periods as well as changes that occurred in the classification model between two time periods are identified, among other features as described herein. In doing so, the technical solution changes the way computers operate to improve performance of a chatbot by the technological improvements of deploying a virtual assistant analytic module that generates and stores analytic metrics, that identify model improvements for intents, ranks and outputs the intents to update for model improvements for a time period in a timeline and/or between two time periods of a timeline during which different releases of the chatbot were active, among other features.

Implementations of the present disclosure may be a system, a method, and/or a computer program product. The computer program product may include a computer readable storage medium (or media) having computer readable program instructions thereon for causing a processor to carry out aspects of the present disclosure.

Figure 1:
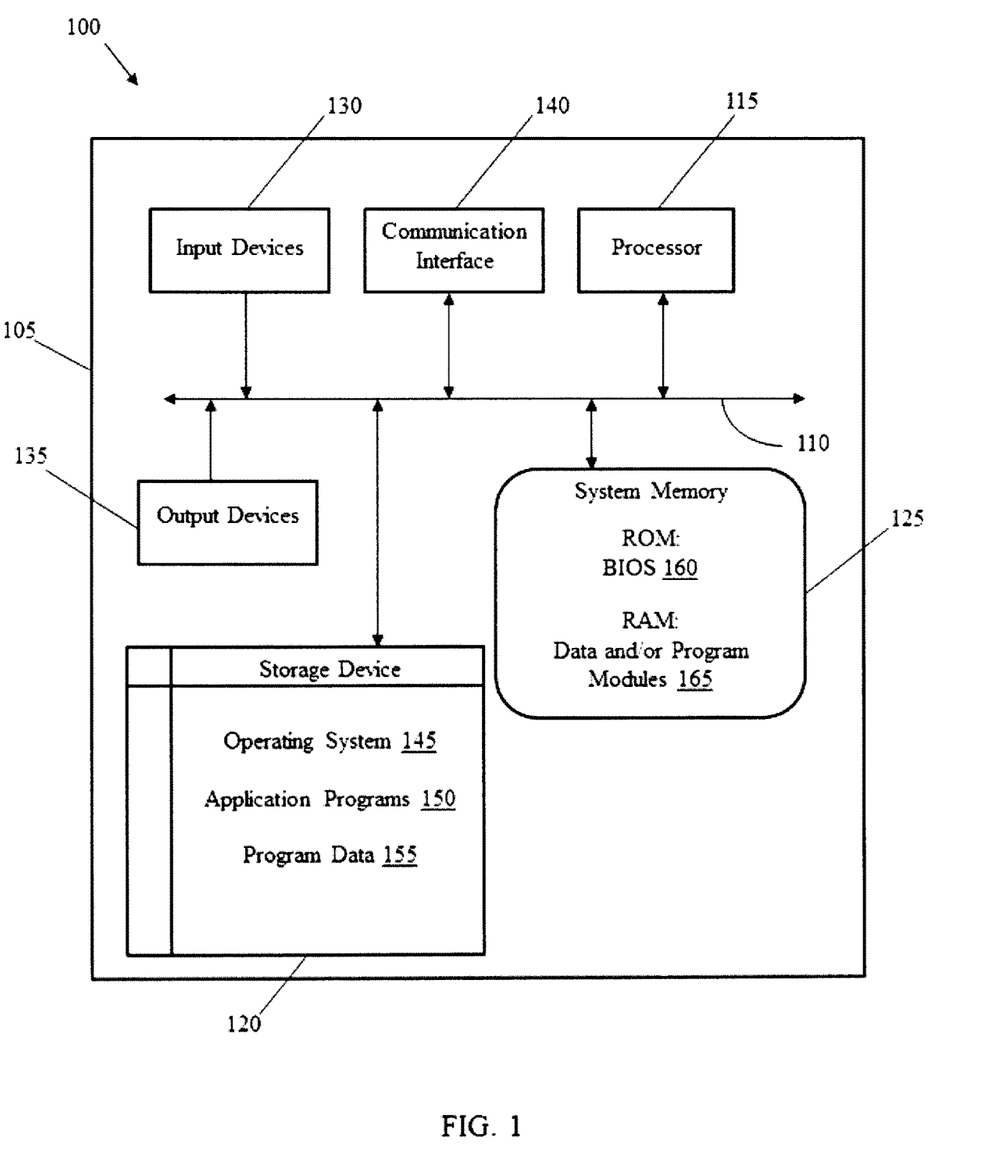
FIG. 1 is an illustrative architecture of a computing system according to embodiments of the present disclosure.

FIG. 1 is an illustrative architecture of a computing system 100 implemented in embodiments of the present disclosure. The computing system 100 is only one example of a suitable computing system and is not intended to suggest any limitation as to the scope of use or functionality of the disclosure. Also, computing system 100 should not be interpreted as having any dependency or requirement relating to any one or combination of components illustrated in computing system 100. Moreover, the system and method described herein may be implemented in the computing system 100 or provided on a computer program product.

Figure 2:
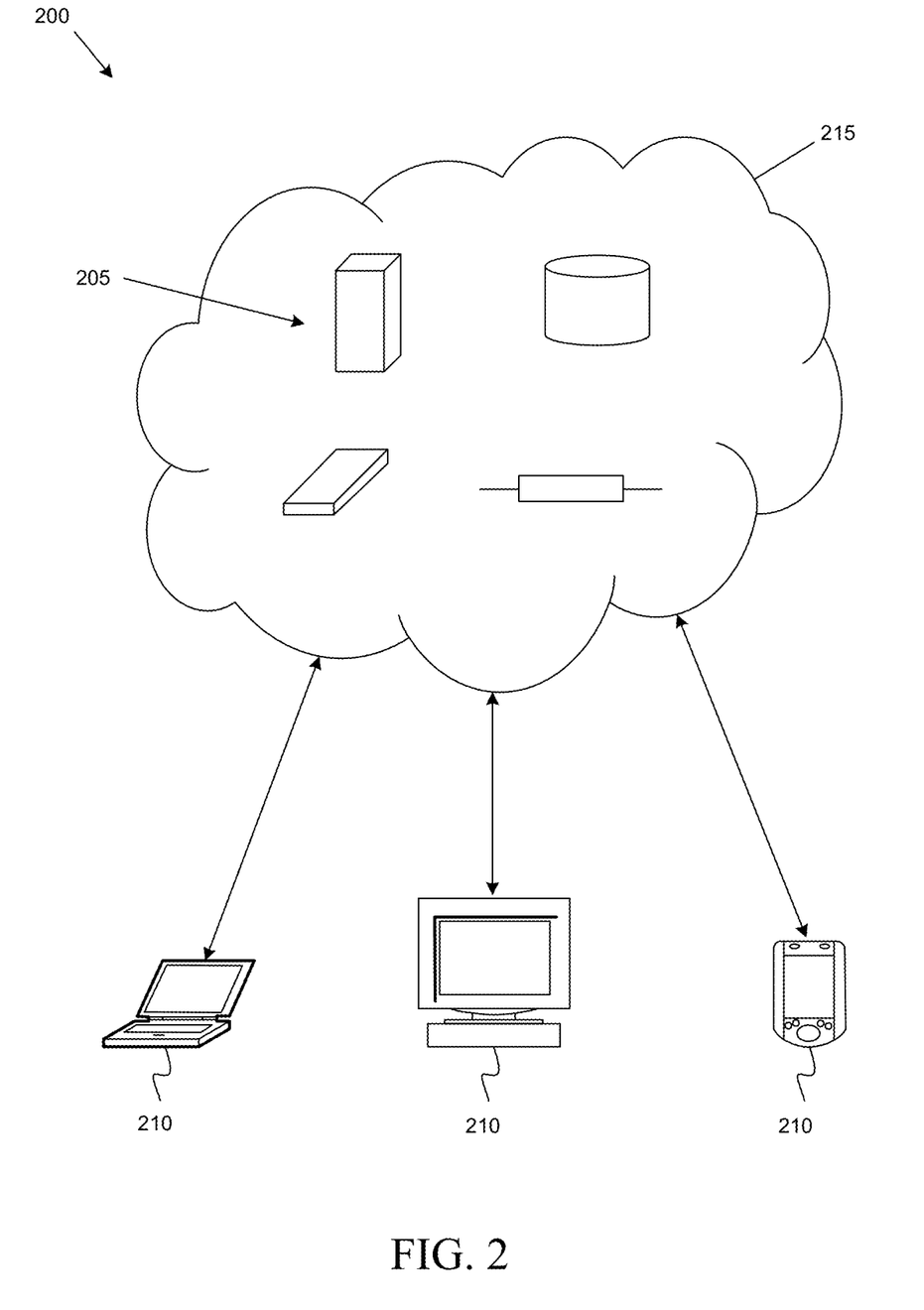
FIG. 2 shows an exemplary cloud computing environment in accordance with aspects of the present disclosure.

As shown in FIG. 1, computing system 100 includes a computing device 105. The computing device 105 can be resident on a network infrastructure such as within a cloud environment as shown in FIG. 2, or may be a separate independent computing device (e.g., a computing device of a third party service provider). The computing device 105 may include a bus 110, a processor 115, a storage device 120, a system memory (hardware device) 125, one or more input devices 130, one or more output devices 135, and a communication interface 140.

The bus 110 permits communication among the components of computing device 105. For example, bus 110 may be any of several types of bus structures including a memory bus or memory controller, a peripheral bus, and a local bus using any of a variety of bus architectures to provide one or more wired or wireless communication links or paths for transferring data and/or power to, from, or between various other components of computing device 105.

The processor 115 may be one or more processors or microprocessors that include any processing circuitry operative to interpret and execute computer readable program instructions, such as program instructions for controlling the operation and performance of one or more of the various other components of computing device 105. In embodiments, processor 115 interprets and executes the processes, steps, functions, and/or operations of the present disclosure, which may be operatively implemented by the computer readable program instructions. For example processor 115 enables the computing device 105 to analyze chatbot performance during a time period by determining the difference between intent metrics from a previous time period to identify model improvements to refresh the chatbot, as described in more detail herein.

In embodiments, processor 115 may receive input signals from one or more input devices 130 and/or drive output signals through one or more output devices 135. The input devices 130 may be, for example, a keyboard, touch sensitive user interface (UI), etc., as is known to those of skill in the art such that no further description is required for a complete understanding of the present disclosure. The output devices 135 can be, for example, any display device, printer, etc., as is known to those of skill in the art such that no further description is required for a complete understanding of the present disclosure.

The storage device 120 may include removable/non-removable, volatile/non-volatile computer readable media, such as, but not limited to, non-transitory media such as magnetic and/or optical recording media and their corresponding drives. The drives and their associated computer readable media provide for storage of computer readable program instructions, data structures, program modules and other data for operation of computing device 105 in accordance with the different aspects of the present disclosure. In embodiments, storage device 120 may store operating system 145, application programs 150, and program data 155 in accordance with aspects of the present disclosure.

The system memory 125 may include one or more storage mediums, including for example, non-transitory media such as flash memory, permanent memory such as read-only memory ("ROM"), semi-permanent memory such as random access memory ("RAM"), any other suitable type of storage component, or any combination thereof. In some embodiments, an input/output system 160 (BIOS) including the basic routines that help to transfer information between the various other components of computing device 105, such as during start-up, may be stored in the ROM. Additionally, data and/or program modules 165, such as at least a portion of operating system 145, application programs 150, and/or program data 155, that are accessible to and/or presently being operated on by processor 115 may be contained in the RAM.

The communication interface 140 may include any transceiver-like mechanism (e.g., a network interface, a network adapter, a modem, or combinations thereof) that enables computing device 105 to communicate with remote devices or systems, such as a mobile device or other computing devices such as, for example, a server in a networked environment, e.g., cloud environment. For example, computing device 105 may be connected to remote devices or systems via one or more local area networks (LAN) and/or one or more wide area networks (WAN) using communication interface 140.

As discussed herein, computing system 100 may be configured as a special-purpose computing device providing analytic operations of chatbot performance during a time period by determining the difference between intent metrics from a previous time period to identify model improvements to refresh the chatbot. In particular, computing device 105 may perform tasks (e.g., process, steps, methods and/or functionality) in response to processor 115 executing program instructions contained in a computer readable medium, such as system memory 125. The program instructions may be read into system memory 125 from another computer readable medium, such as data storage device 120, or from another device via the communication interface 140 or server within or outside of a cloud environment. In embodiments, an operator may interact with computing device 105 via the one or more input devices 130 and/or the one or more output devices 135 to facilitate performance of the tasks and/or realize the end results of such tasks in accordance with aspects of the present disclosure. In additional or alternative embodiments, hardwired circuitry may be used in place of or in combination with the program instructions to implement the tasks, e.g., steps, methods and/or functionality, consistent with the different aspects of the present disclosure. Thus, the steps, methods and/or functionality disclosed herein can be implemented in any combination of hardware circuitry and software.

FIG. 2 shows an exemplary cloud computing environment 200 in accordance with aspects of the disclosure. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with the service provider. In embodiments, one or more aspects, functions and/or processes described herein may be performed and/or provided via cloud computing environment 200.

As depicted in FIG. 2, cloud computing environment 200 includes cloud resources 205 that are made available to client devices 210 via a network 215, such as the Internet. Cloud resources 205 can include a variety of hardware and/or software computing resources, such as servers, databases, storage, networks, applications, and platforms. Cloud resources 205 may be on a single network or a distributed network. Cloud resources 205 may be distributed across multiple cloud computing systems and/or individual network enabled computing devices. Client devices 210 may comprise any suitable type of network-enabled computing device, such as servers, desktop computers, laptop computers, handheld computers (e.g., smartphones, tablet computers), set top boxes, and network-enabled hard drives. Cloud resources 205 are typically provided and maintained by a service provider so that a client does not need to maintain resources on a local client device 210. In embodiments, cloud resources 205 may include one or more computing system 100 of FIG. 1 that is specifically adapted to perform one or more of the functions and/or processes described herein.

Cloud computing environment 200 may be configured such that cloud resources 205 provide computing resources to client devices 210 through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 210. For example, cloud resources 205 can provide both SaaS and IaaS to a client device 210. Cloud resources 205 may be configured, in some cases, to provide different service models to different client devices 210. For example, cloud resources 205 can provide SaaS to a first client device 210 and PaaS to a second client device 210.

Cloud computing environment 200 may be configured such that cloud resources 205 provide computing resources to client devices 210 through a variety of deployment models, such as public, private, community, hybrid, and/or any other cloud deployment model. Cloud resources 205 may be configured, in some cases, to support multiple deployment models. For example, cloud resources 205 can provide one set of computing resources through a public deployment model and another set of computing resources through a private deployment model.

In embodiments, software and/or hardware that performs one or more of the aspects, functions and/or processes described herein may be accessed and/or utilized by a client (e.g., an enterprise or an end user) as one or more of an SaaS, PaaS and IaaS model in one or more of a private, community, public, and hybrid cloud. Moreover, although this disclosure includes a description of cloud computing, the systems and methods described herein are not limited to cloud computing and instead can be implemented on any suitable computing environment.

Cloud resources 205 may be configured to provide a variety of functionality that involves user interaction. Accordingly, a user interface (UI) can be provided for communicating with cloud resources 205 and/or performing tasks associated with cloud resources 205. The UI can be accessed via a client device 210 in communication with cloud resources 205. The UI can be configured to operate in a variety of client modes, including a fat client mode, a thin client mode, or a hybrid client mode, depending on the storage and processing capabilities of cloud resources 205 and/or client device 210. Therefore, a UI can be implemented as a standalone application operating at the client device in some embodiments. In other embodiments, a web browser-based portal can be used to provide the UI. Any other configuration to access cloud resources 205 can also be used in various implementations.

Figure 3:
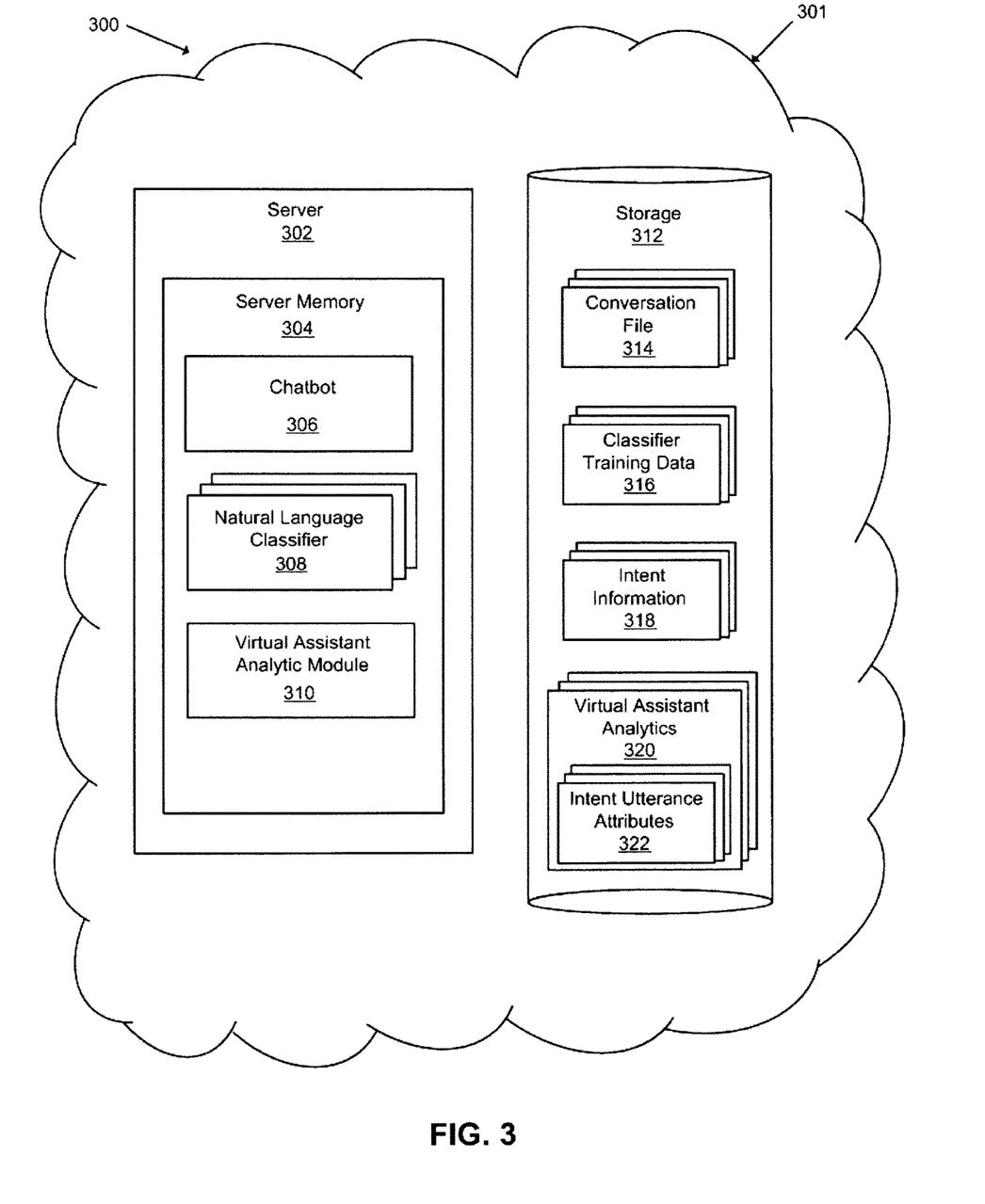
FIG. 3 is a block diagram illustrating an exemplary environment in accordance with aspects of the present disclosure.

FIG. 3 shows a block diagram of a server in a cloud computing environment in accordance with aspects of the present disclosure. In embodiments, the cloud computing environment 300 includes a server 302, which may be a computing device such as a computing device 105 described with respect to FIG. 1 and is a cloud resource such as cloud resource 205 described with respect to FIG. 2 available to client devices 210 via a network 301, such as the Internet. In general, the server 302 supports services for users on client devices to engage in chat conversations with a chatbot by typing natural language text.

Server 302 includes, e.g., in a server memory 304 such as memory 125 described with respect to FIG. 1, a chatbot 306 having functionality to engage in chat conversations with users on client devices and log conversational transcripts of chat conversations. In embodiments, the chatbot may receive natural language text input by a user, input the natural language text into natural language classifiers 308, receive an identification of an intent output by the natural language classifiers, and select a response to provide to the user for the intent identified by the natural language classifiers. The chatbot may also be instrumented to generate various events and metrics associated with chat conversation in addition to the intent identified by the natural language classifiers, such as the satisfaction of a user with the responses provided to the user in the chat conversation, the escalation of the chat conversation from the chatbot to a live agent, the containment of the chat conversation by the chatbot without escalation to a live agent, the confidence probability that the natural language classifiers accurately identified the intent, and so forth. These events and metrics may be associated as attributes of utterances from a chat conversation and stored along with the chat conversation transcript in a conversation file 314 in storage 312.

The server 302 also includes, e.g., in server memory 304, natural language classifiers 308 having functionality to determine the intent for a conversation with a user. In an implementation, there may be a supervised multiclass natural language classifier, in embodiments, having a class trained for each intent in the classification model. The classifier training data for training each class in the classification model is stored in classifier training data files 316 in storage 312, and the intents for each class in the classification model are stored in intent information files 318 in storage 312 that may also include utterances for each classification of an intent in embodiments. The natural language classifiers 308, in embodiments, may also be instrumented to generate various events, information and metrics associated as attributes of utterances from natural language text of a chat conversation, including utterance n-grams, a confidence probability of accurately identifying an intent, utterances not recognized, and so forth.

The server 302 also includes, e.g., in server memory 304, a virtual assistant analytic module 310 having functionality to analyze for timeline periods, such as the time periods during which different releases of the chatbot were active, attributes of utterances including the events, metrics, and other information generated during chat conversations and stored with the conversation transcripts. In embodiments, the virtual assistant analytic module 310 analyzes the attributes of utterances including the events, metrics, and other information stored for chat conversations in the conversation files 314, generates and stores analytic metrics that identifies model improvements for intents in the virtual assistant analytics file 320 with analytics of individual intent utterance attributes 322, ranks and outputs the intents to update for model improvements for a time period in a timeline and/or between two time periods of a timeline during which different releases of the chatbot were active.

The virtual assistant analytic module 310 may also identify changes in metrics between two time periods as well as changes that occurred in the classification model between two time periods. For example, among the intents identified to update in order to improve the classification model, there may be an unrecognized intent to add as a new class to the classification model. Or there may be utterances occurring in chat conversations that provide improved training data for an existing intent that can be added to the training data to improve the accuracy of the classification model in embodiments.

The chatbot 306, the natural language classifiers 308, and the virtual assistant analytic module 310 may each comprise one or more program modules such as program modules 165 described with respect to FIG. 1. The system 300 may include additional or fewer modules than those shown in FIG. 3. For example, separate modules may be integrated into a single module or a single module may be implemented as multiple modules. Moreover, in practice, the environment 300 may include additional devices and/or networks; fewer devices and/or networks; different devices and/or networks; or differently arranged devices and/or networks than illustrated in FIGS. 1-3.

In accordance with aspects of the disclosure, FIG. 3 also shows a block diagram of a storage system in a cloud computing environment. In embodiments, the cloud computing environment 300 includes a storage 312, which may be a computing device such as a computing device 105 described with respect to FIG. 1 and is a cloud resource such as cloud resource 205 described with respect to FIG. 2 that communicates with the server 302 via a network 301, such as the Internet. In general, the storage 312 may store conversation files 314 that each include a conversation transcript and attributes of utterances such as events, metrics, and other information generated during a chat conversation. The events, metrics and other information may be generated by one or more program modules of the server 302, including the chatbot 306, the natural language classifiers 308 and the virtual assistant analytic module 310, instrumented to record an event, metric or other information during the course of a chat conversation for monitoring the capability of the chatbot to understand the information the user wants and to provide that information in responses that satisfy the user.

For example, the events, metrics and other information may include the satisfaction of a user with the responses provided to the user in the chat conversation, the escalation of the chat conversation from the chatbot to a live agent, the containment of the chat conversation by the chatbot without escalation to a live agent, the confidence probability that the natural language classifiers accurately identified the intent, and other attributes of utterances from natural language text of a chat conversation, such as utterance n-grams, utterances not recognized, and so forth. In embodiments, the events, metrics or other information stored in conversation files 314 may be further supplemented by a live agent for a chat conversation escalated to a live agent.

The storage 312 may also store classifier training data in classifier training data files 316 used to train a multiclass natural language classifier having training data for each intent represented by a class in the classification model. The training data includes utterances of user intents for information sought from the chatbot. The storage 312 may also store intent information in intent information files 318 that includes the intents labeled for each class in the classification model along with utterances for a labeled intent.

The storage 312 may additionally store analytic metrics that identifies model improvements for intents in the virtual assistant analytics file 320 with analytics of individual intent utterance attributes 322. In embodiments, these analytics stored in the virtual assistant analytics file 320 may identify intents to update for model improvements for a time period in a timeline and/or between two time periods of a timeline during which different releases of the chatbot were active. These analytics may also identify changes in metrics between two time periods as well as changes that occurred in the classification model between two time periods in embodiments.

Figure 4:
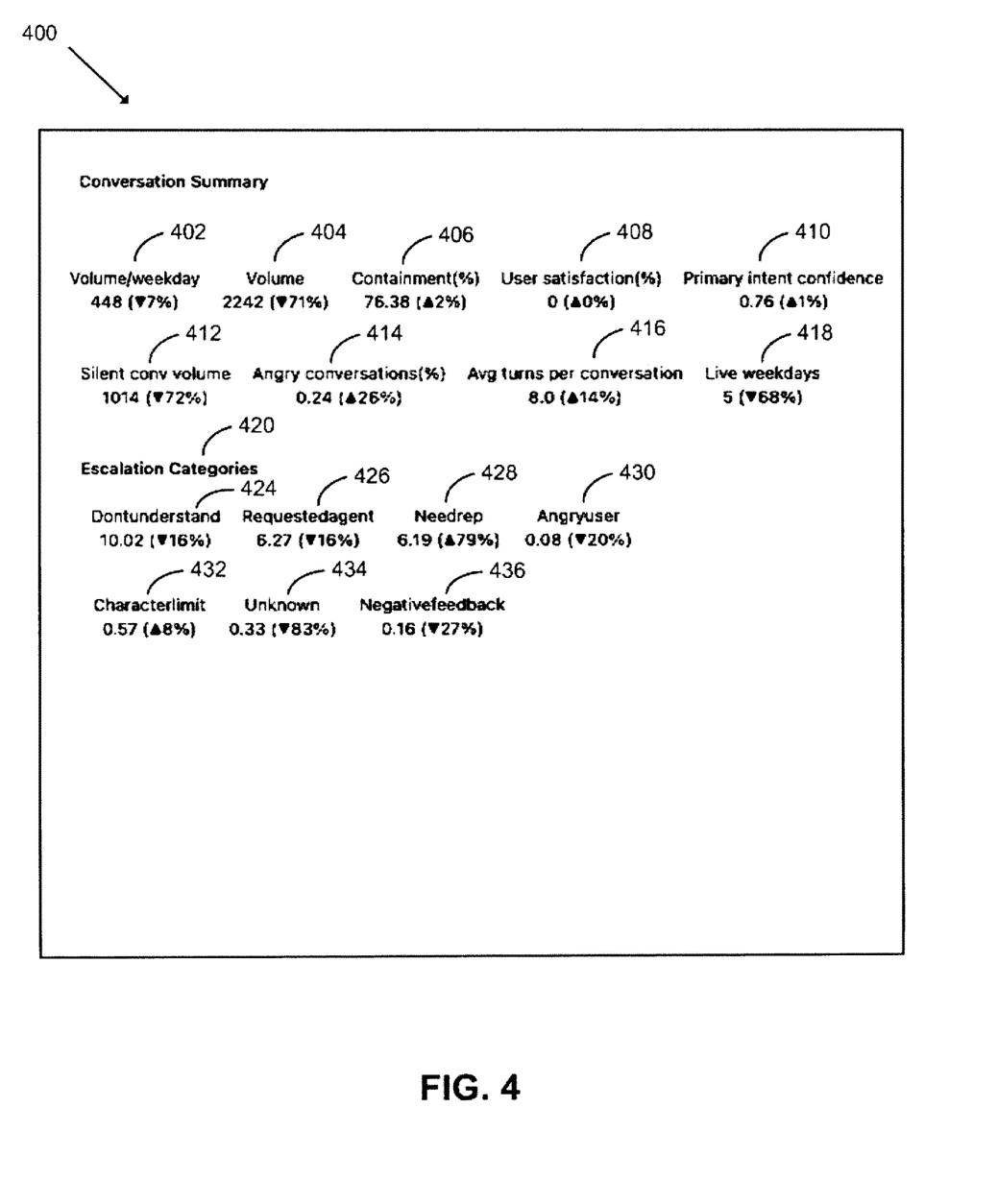
FIG. 4 depicts an illustration of exemplary metrics in accordance with aspects of the present disclosure.

FIGS. 4-6 depict illustrations of exemplary analytic metrics for model improvements in accordance with aspects of the present disclosure. The metrics illustrated for example include, without limitation, types of conversational summary metrics compared from one time period to an earlier time period, metric movers representing prominent intents contributing to an increase or decrease in metrics compared from one time period to an earlier time period, and top gainers/losers representing intents contributing the most positive and negative impacts on metrics compared from one time period to an earlier time period. These illustrated examples of metrics for updating intents to improve the model have been provided merely for the purpose of explanation and are in no way to be construed as limiting of the present disclosure.

FIG. 4 depicts an illustration of exemplary types of conversational summary metrics in accordance with aspects of the present disclosure. For example, the illustration 400 of FIG. 4 depicts types of conversational summary metrics that may be provided in a timeline analysis comparing the change in a specific metric for a given time period to an earlier time period. Each of the conversational metrics are presented as a number representing the count of occurrence in the given time period and a percentage of change in the number of occurrences from an earlier time period. The type of conversational metrics illustrated in FIG. 4 include the volume/weekday of conversations 402, the volume of conversations 404, the containment of conversations 406, the user satisfaction of conversations 408, the primary intent confidence 410, silent conversation volume 412, angry conversations 414, average turns per conversation 416, and live weekdays 418.

Also included in the types of conversational summary metrics may be escalation category metrics that provide a count of various reasons that a conversation escalated to a live agent, such as dontunderstand 424 (system does not understand the inquiry), requestedagent 426 (requested an agent), needrep 428 (need a representative), angryuser 430 (angry user), characterlimit 432 (exceeded the input character limitation), unknown 434 (unknown reason for escalation), and negativefeedback 436 (provided negative feedback). For example, the metric dontunderstand 424 counts the occurrences that the chatbot's the natural language classifiers were not able to recognize the topic of an inquiry by a user, and consequently may represent an unrecognized intent that may be add as a new class to the classification model or may represent a poorly defined intent that needs to be better defined in the classification model. As other examples, the metrics requestedagent 426 and needrep 428 counts the occurrences respectively that the user asked the chatbot to speak with a live agent or representative, and consequently may identify intents that need a change in response to the user inquiry from the chatbot and/or updated training data for an intent in the classification model to improve the recognition of the topic of inquiry. As still other examples, the metrics angryuser 430 and negativefeedback 436 counts the occurrences respectively that the user was angry and provided negative feedback, and consequently represent substantial dissatisfaction with the chatbot conversation and chatbot's responses to the user's inquiries that require triage of the reasons provided by the user for their anger and negative feedback. Each of these conversational metrics capture useful information about the chatbot conversations and the performance of the chatbot handling the conversations during the given time period, as well as changes in the performance of the chatbot handling conversations from an earlier time period. These illustrative examples of metrics for determining change in the performance of a chatbot handling conversations between two time periods are not to be construed as limiting of the present disclosure. Other metrics for determining change in the performance of a chatbot handling conversations between two time periods may be used in embodiments.

FIG. 5 depicts an illustration of exemplary types of conversational summary metrics for identifying prominent intents with significant changes in the chatbot's performance in handling conversations, in accordance with aspects of the present disclosure. For example, the illustration 500 of FIG. 5 depicts metric movers representing prominent intents contributing to an increase or decrease in metrics compared in a given time period to an earlier time period, and consequently identifying intents with the most significant changes in the performance of the chatbot handling inquiries in the given time period. Thus, these intents identified by the system represent promising candidates to update to improve performance of the chatbot.

These illustrated metrics include containment 502, volume 504, confidence 506, and escalation reasons negativefeedback 508, dontunderstand 510, requestedagent 512, needrep 514, angryuser 516, characterlimit 518, unknown 520. For instance, the metric containment 502 counts the occurrences that the conversation with a user was contained within the chatbot conversation without escalation to a live agent. A decrease in the containment metric 502 for an intent indicates that the chatbot's recognition and/or responses to the topic of inquiry are becoming inadequate, and consequently the intent recognized may need to be refined in the classification model and/or the response updated to satisfy the user inquiry. And the metric volume 504 counts the number of conversations that occurred. An increase or decrease in this metric for an intent indicates changes in the demand by users to inquire about the topic and consequently identifies the importance of the topic to chatbot users. Additionally, the metric confidence 506 provides a percentage of confidence that the chatbot's natural language classifiers recognized the intent from the user inquiries. An increase or decrease in this metric indicates the delineation achieved among intent definitions in the classification model and the quality of training data for the intent classes. Decreases in this metric for intents may identify fading of the delineation among intent definitions in the classification model, and consequently recent changes made in the definition of intents in the classification model may require refinement of their definitions. The remaining metrics illustrated in FIG. 5 represent escalation category metrics which are each described above with respect to FIG. 4.

The prominent intents in each metric are in rank order by count identifying the most significant intent contributing to the behavior measured by the metric. For example, the head of each ranked list under a given conversational metric identifies the intent contributing most to the change in performance for that metric. In embodiments, the percent contributing to positive change indicated for a metric may be color-coded in red (non shown), and the percent contributing to negative change for a metric may be color-coded in black (not shown). Those intents identified as contributing to the most significant negative change represent intents most in need of change to improve chatbot performance.

FIG. 6 depicts an illustration of exemplary types of conversational summary metrics for identifying intents with the most significant positive change in performance and intents with the most significant negative change in the chatbot's performance in handling conversations, in accordance with aspects of the present disclosure. For example, the illustration 600 of FIG. 6 depicts metrics of top gainers/losers representing intents contributing the most positive and negative impacts on metrics compared in a time period to an earlier time period and may include metrics for containment 602, volume 604, confidence 606, and escalation reasons negativefeedback 608, dontunderstand 610, requestedagent 612, needrep 614, angryuser 616, characterlimit 618, and unknown 620, each described above with respect to FIG. 5. The top gainer intents contributing to positive change in performance of the chatbot have an upward pointing symbol next to their percentage gain. The top loser intents contributing to negative change in performance of the chatbot have a downward pointing symbol next to their percentage. In embodiments, the percent contributing to positive change indicated for a metric may be color-coded in red (non shown), and the percent contributing to negative change for a metric may be color-coded in black (not shown). Each list has rank ordered the top 5 gainers followed by the top 5 losers, unless there are less than 5 instances occurring for a metric in a time period. These metrics identify intents that caused the biggest impact in metrics changing. The intents that caused the biggest negative impact are identified and most in need of change to improve chatbot performance.

Figure 7:
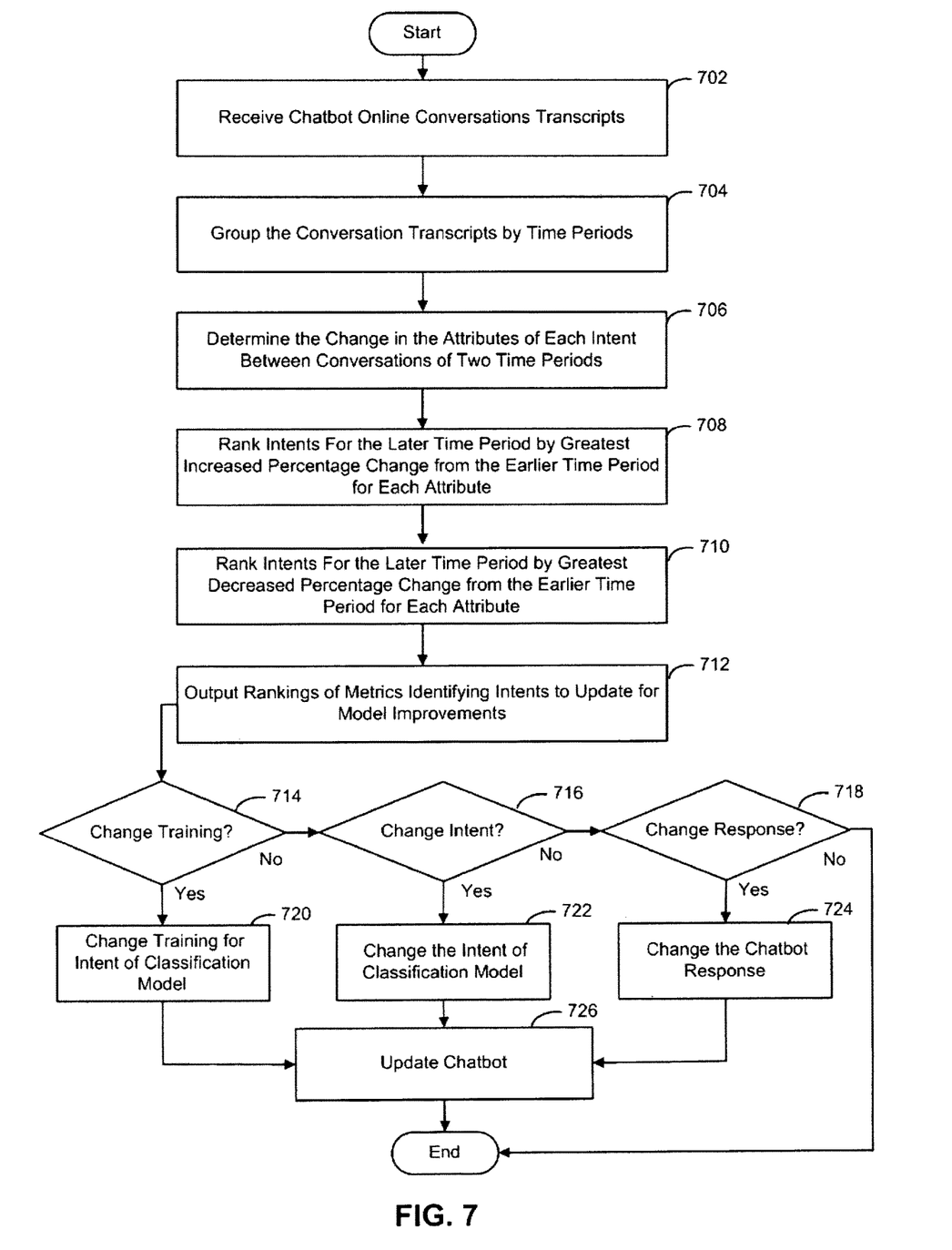
FIG. 7 shows a flowchart of an exemplary method in accordance with aspects of the present disclosure.

FIG. 7 show a flowchart and/or block diagram that illustrate the architecture, functionality, and operation of possible implementations of systems, methods, and computer program products according to various embodiments of the present disclosure. Each block may represent a module, segment, or portion of instructions, which comprises one or more executable instructions for implementing the specified logical function(s). The functions noted in the blocks may occur out of the order, two blocks shown in succession may, in fact, be accomplished as one step, executed concurrently, substantially concurrently, in a partially or wholly temporally overlapping manner, or the blocks may sometimes be executed in the reverse order, depending upon the functionality involved. And some blocks shown may be executed and other blocks not executed, depending upon the functionality involved.

Moreover, the exemplary flowcharts and/or block diagrams can be illustrative of a system, a process, and/or a computer program product and related functionality implemented on the computing system of FIG. 1. The computer program product may include computer readable program instructions stored on computer readable storage medium (or media). The computer readable storage medium may include one or more tangible storage medium as described with regard to FIG. 1, e.g., non-transitory media, a tangible device, etc. The processes and/or computer program product implementing the flowcharts and/or block diagrams can be downloaded to respective computing/processing devices, e.g., computing system of FIG. 1 as already described herein, or implemented on a cloud infrastructure as described with regard to FIGS. 2 and 3. Accordingly, the processes associated with the flowcharts and/or block diagrams of the present disclosure can be implemented by special purpose hardware-based systems that perform the specified functions or acts or carry out combinations of special purpose hardware and computer instructions.

FIG. 7 shows a flowchart of an exemplary method in accordance with aspects of the present disclosure. Steps of the method may be carried out in the environment of FIGS. 2 and 3, and are described with reference to elements depicted in FIGS. 2 and 3. In particular, the flowchart of FIG. 7 shows an exemplary method for periodically refreshing a chatbot from timeline analytics of chat conversations to improve performance, in accordance with aspects of the present disclosure.

At step 702, the system receives chatbot online conversation transcripts. For example, conversation transcripts along with events, metrics, and attributes of utterances associated with a chat conversation and stored with each chat conversation transcript in conversation files may be received, in embodiments, for timeline periods such as the time periods during which different releases of the chatbot were active. For instance, each conversational transcript may be associated with a date and time of each release of the chatbot. In embodiments, the virtual assistant analytic module 310 implemented on a server 302, each described with respect to FIG. 3, can receive chatbot online conversation transcripts from conversation files 314 in storage 312.

At step 704, the system groups the conversation transcripts by time periods. In embodiments, each conversational transcript may be associated with a date and time of each release of the chatbot, and each of these releases identify different time periods in which the chatbot was active and generating conversation transcripts. To group the conversation transcripts by time period, the system can group the conversation transcripts by releases of the chatbot. In embodiments, the virtual assistant analytic module 310 implemented on a server 302, each described with respect to FIG. 3, can group the conversation transcripts by time periods.

At step 706, the system determines the change in the attributes of each intent between conversations of two time periods. For example, the system may generate summary conversational metrics for attributes of each intent for each time period and compare each summary conversational metric in a time period to each corresponding summary conversational metric in an earlier time period to determine the change in the attributes of each intent between conversations of two time periods. For example, a summary metric for the volume of conversations for an intent may be generated for each of two time periods, compared, and values indicating the change, such as a count or percent of change increasing or decreasing, may be determined and stored as analytic metrics. The system may similarly determine the change in the attributes of each intent between conversations of two time periods by generating summary metrics for other metrics, including containment of conversations, user satisfaction, primary intent confidence, silent conversation volume, angry conversations, average turns per conversation, live weekdays, feedback and escalation categories to name a few. These illustrated examples of metrics for determining change in the attributes of each intent between conversations of two time periods have been provided merely for the purpose of explanation and are in no way to be construed as limiting of the present disclosure. In embodiments, the virtual assistant analytic module 310 described with respect to FIG. 3 can determine the change in the attributes of each intent between conversations of two time periods.

At step 708, the system ranks intents for the later time period by greatest increased percentage change from an earlier time period for each attribute of the intents. For each attribute, the system may rank, for instance, the intents in order by greatest increased percentage change reflected in the summary metric of that attribute for the later time period from the earlier time period. For example, a summary metric for the volume of conversations for an intent generated in an embodiment by comparison of the volume of conversations for each of two time periods may have as a value indicating an increased percent of change. The system may include this intent with this summary metric for the volume of conversations among other intents that have a summary metric with a value of an increased percent of change for the attribute of volume of conversations in the ranking by greatest increased percentage change for the attribute of volume of conversations. In embodiments, the virtual assistant analytic module 310 described with respect to FIG. 3 can rank intents for the later time period by greatest increased percentage change from an earlier time period for each attribute of the intents.

At step 710, the system ranks intents for the later time period by greatest decreased percentage change from an earlier time period for each attribute. For each attribute, the system may rank, for instance, the intents in order by greatest decreased percentage change reflected in the summary metric of that attribute for the later time period from the earlier time period. For example, a summary metric for the containment of conversations for an intent generated by comparison of the volume of conversations for each of two time periods may have as a value indicating a decreased percent of change. The system may include this intent with this summary metric for the containment of conversations among other intents that have a summary metric with a value of a decreased percent of change for the attribute of containment of conversations in the ranking by greatest decreased percentage change for the attribute of containment of conversations. In embodiments, the virtual assistant analytic module 310 described with respect to FIG. 3 can rank intents for the later time period by greatest decreased percentage change from an earlier time period for each attribute of the intents.

At step 712, the system outputs rankings of metrics identifying intents to update for model improvements. For instance, the system may output the ranking as illustrated in FIG. 5 of metric movers representing prominent intents contributing to an increase or decrease in metrics compared in a time period such as a current release of a chatbot to an earlier time period such as the preceding release of the chatbot. Or the system may output the ranking in as illustrated in FIG. 6 of top gainers/losers representing intents contributing the most positive and negative impacts on metrics compared in a time period to an earlier time period. Metrics of intents with greatest negative impact in these illustrations, for instance, identify intents to update for model improvement.

As a more specific example, intents with a high count of volume of conversation metrics that are ranked among intents with the greatest decreased percentage change for the metric of primary intent confidence, identify intents that are in need of changing the training data for those intents in the classification model. As another example, intents with a high count of volume of conversation metrics that are ranked among intents with the greatest increase percentage change for escalation metrics, may identify intents that need a change in defining the intent in the classification model. Those skilled in the art should appreciate that other combinations of the rankings of metrics identifying intents to update for model improvements may be output. In embodiments, the virtual assistant analytic module 310 can output rankings of metrics identifying intents to update for model improvements.

At step 714, a supervisor of the supervised natural language classifier determines if intents are identified that require changing. For example, intents with a high count of volume of conversation metrics that are ranked by the system among intents with the greatest decreased percentage change for the metric of primary intent confidence identify intents that are in need of changing the training data for those intents in the classification model. If intents are identified for changing training data, training data for identified intents may be changed for the classification model at step 720. If not, carrying out steps of the exemplary method continue at step 716.

At step 716, a supervisor of the supervised natural language classifier determines if intents are identified that need a change in defining the intent in the classification model. For example, intents with a high count of volume of conversation metrics that are ranked among intents with the greatest increased percentage change for escalation metrics identify intents that need a change in defining the intent in the classification model. As another example, intents with a high count of volume of conversation metrics that are ranked among intents with the greatest increased percentage change for an escalated reason of don't understand identify intents that need a change in defining the intent in the classification model. If intents are identified that need a change in defining the intent in the classification model, the definition of the intents identified may be changed in the classification model at step 722. If not, carrying out steps of the exemplary method continue at step 718.

At step 718, a supervisor of the supervised natural language classifier determines if responses provided to the user for an intent need to be changed for the chatbot. For example, intents with a high count of volume of conversation metrics that are ranked among intents with the greatest increased percentage change for an escalated reason of need representative identify intents that may need a change in response to the user from the chatbot. If intents are identified that need a change in response provided to a user from the chatbot, the response may be changed from the chatbot at step 724. If not, carrying out the steps of the exemplary method is finished.

At step 720, a supervisor of the supervised natural language classifier changes training data for identified intents for the classification model. In embodiments, the supervisor may modify the training data stored in the classifier training data files 316 in storage 312, each described with respect to FIG. 3.

At step 722, a supervisor of the supervised natural language classifier changes the definition of the intents identified to be changed in the classification model. In embodiments, the supervisor may change the definition of the intent stored in the intent information files 318 described with respect to FIG. 3.

At step 724, a supervisor of the supervised natural language classifier changes the responses provided to the user from the chatbot for identified intents. And at step 726, the chatbot may be updated with modified responses provided to the user for identified intents, and the classification model may be trained with the changed definitions of intents and changed training data for identified intents. Accordingly, a chatbot may be periodically refreshed from timeline analytics of chat conversations to improve performance in embodiments.

The foregoing examples have been provided merely for the purpose of explanation and are in no way to be construed as limiting of the present disclosure. While aspects of the present disclosure have been described with reference to an exemplary embodiment, it is understood that the words which have been used herein are words of description and illustration, rather than words of limitation. Changes may be made, within the purview of the appended claims, as presently stated and as amended, without departing from the scope and spirit of the present disclosure in its aspects. Although aspects of the present disclosure have been described herein with reference to particular means, materials and embodiments, the present disclosure is not intended to be limited to the particulars disclosed herein; rather, the present disclosure extends to all functionally equivalent structures, methods and uses, such as are within the scope of the appended claims.

What is claimed is:

1. A method, comprising:
   receiving, by a computing device, from a memory, a plurality of conversation transcripts generated from a plurality of versions of a chatbot, each of the plurality of versions of the chatbot is trained using first training data comprising a plurality of attributes of intents, wherein each of the plurality of versions of the chatbot is based on one or more variations in the plurality of attributes of intents;
   receiving, by the computing device, second training data for at least one intent from a plurality of changes of the plurality of attributes of intents;
   executing, by the computing device, a training procedure to update a natural language classification model of the chatbot using the second training data;
   generating, by the computing device, in response to executing the training procedure, another version of the chatbot having the updated natural language classification model that includes the at least one intent updated from the plurality of changes of the plurality of attributes of intents to improve performance of the chatbot;
   storing, by the computing device, the another version of the chatbot in the memory; and
   deploying, by the computing device from the memory, the another version of the chatbot.

2. The method of claim 1, further comprising analyzing, by the computing device, the plurality of attributes of intents associated with the plurality of conversation transcripts from the plurality of versions of the chatbot.

3. The method of claim 1, further comprising ranking, by the computing device, the plurality of the changes of the plurality of attributes of intents associated with the plurality of conversation transcripts between the plurality of versions of the chatbot.

4. The method of claim 1, further comprising ranking, by the computing device, for each of the plurality of attributes of intents, intents with a greatest increase in change of the plurality of changes.

5. The method of claim 1, further comprising ranking, by the computing device, for each of the plurality of attributes of intents, intents with a greatest decrease in change of the plurality of changes.

6. The method of claim 1, further comprising:
   identifying, by the computing device, a specification of at least one intent from the plurality of changes of the plurality of attributes of intents to update for training the natural language classification model of the chatbot to improve the performance of the chatbot; and
   generating, by the computing device, the another version of the chatbot that includes the natural language classification model trained with the at least one intent updated from the plurality of changes of the plurality of attributes of intents to improve the performance of the chatbot.

7. The method of claim 1, wherein an attribute of the plurality of attributes of intents comprises a volume of conversations.

8. The method of claim 1, wherein an attribute of the plurality of attributes of intents comprises containment of a conversation within the chatbot.

9. The method of claim 1, wherein the at least one intent to update from the plurality of changes of the plurality of attributes of intents to improve the performance of the chatbot comprises the at least one intent impacting the plurality of versions of the chatbot negatively.

10. The method of claim 1, wherein an attribute of the plurality of attributes of intents comprises primary intent confidence.

11. A non-transitory computer-readable medium storing instructions that, when executed by one or more hardware processors, cause the one or more hardware processors to:
   receive, from a memory, a plurality of conversation transcripts generated from a plurality of different time periods by a chatbot, the chatbot trained using first training data comprising a plurality of attributes of intents, wherein each of the plurality of different time periods associated with a plurality of versions of the chatbot is based on one or more variations in the plurality of attributes of intents;
   receive, from the memory, second training data for at least one first intent from a plurality of intents with a greatest increase in change from a plurality of changes of the plurality of attributes of intents associated with the plurality of conversation transcripts from the plurality of different time periods by the chatbot and at least one second intent from the plurality of intents with a greatest decrease in change from the plurality of changes of the plurality of attributes of intents associated with the plurality of conversation transcripts from the plurality of different time periods by the chatbot;

generate, by executing a training procedure that updates a natural language classification model of the chatbot using the second training data, a version of the chatbot that includes the at least one first intent and the at least one second intent updated from the plurality of intents with the greatest increase in change and the greatest decrease in change, respectively, to improve performance of the chatbot;

store the version of the chatbot in the memory; and deploy, from the memory, the version of the chatbot.

12. The non-transitory computer-readable medium of claim 11, wherein an attribute of the plurality of attributes of intents comprises a volume of conversations.

13. The non-transitory computer-readable medium of claim 12, wherein the attribute of the plurality of attributes of intents comprises primary intent confidence.

14. A system comprising:
a processor, a computer readable memory, one or more computer readable storage media, and program instructions collectively stored on the one or more computer readable storage media, the program instructions executable to:
receive, from a memory, a plurality of conversation transcripts generated from a plurality of different versions of a chatbot, each of the plurality of different versions of the chatbot is trained using first training data comprising a plurality of attributes of intents, wherein each of the plurality of different versions of the chatbot is based on one or more variations in the plurality of attributes of intents, wherein a plurality of changes of the plurality of attributes of intents are associated with the plurality of conversation transcripts from the plurality of different versions of the chatbot;

receive, from the memory, second training data for at least one intent from the plurality of changes of the plurality of attributes of intents;

execute a training procedure to update a natural language classification model of the chatbot using the second training data;

generate, in response to executing the training procedure, another version of the chatbot having the updated natural language classification model that includes the at least one intent updated from the plurality of changes of the plurality of attributes of intents;

store the another version of the chatbot in the memory; and deploy, from the memory, the another version of the chatbot.

15. The system of claim 14, the program instructions further executable to rank the plurality of changes of the plurality of attributes of intents associated with the plurality of conversation transcripts between the plurality of different versions of the chatbot.

16. The system of claim 14, the program instructions further executable to determine the plurality of the changes of the plurality of attributes of intents between the plurality of different versions of the chatbot.

17. The system of claim 14, wherein an attribute of the plurality of attributes of intents comprises a volume of conversations.

18. The system of claim 14, wherein an attribute of the plurality of attributes of intents comprises primary intent confidence.

19. The system of claim 14, wherein an attribute of the plurality of attributes of intents comprises a reason for escalation to a live agent.

* * * * *